United States Patent [19]

McLeod

[11] Patent Number: 5,071,476
[45] Date of Patent: Dec. 10, 1991

[54] RECOVERY SILVER FROM PHOTO SENSITIVE MATERIALS

[75] Inventor: Richard A. McLeod, Edmonton, Canada

[73] Assignees: Mini Labs Limited; Ramparts Tractor Parts Limited, Edmonton, Canada; a part interest

[21] Appl. No.: 284,713

[22] Filed: Dec. 14, 1988

[30] Foreign Application Priority Data

Dec. 24, 1987 [CA] Canada .................................. 555,373

[51] Int. Cl.$^5$ .............................................. C22B 11/00
[52] U.S. Cl. ..................................................... 75/713
[58] Field of Search .......................................... 75/713

[56] References Cited
U.S. PATENT DOCUMENTS

| | | | |
|---|---|---|---|
| 3,647,422 | 3/1972 | Wainer | 75/713 |
| 3,748,123 | 7/1973 | Bakker | 75/713 |
| 3,873,314 | 3/1975 | Woo et al. | 75/713 |
| 3,982,932 | 9/1976 | Korosi | 75/713 |
| 4,078,916 | 3/1978 | Gerber et al. | 75/713 |
| 4,150,977 | 4/1979 | Phillips | 75/713 |
| 4,293,333 | 10/1981 | Drobot | 75/713 |
| 4,392,889 | 7/1983 | Grout | 75/713 |
| 4,868,120 | 9/1989 | Eguchi | 75/713 |

FOREIGN PATENT DOCUMENTS 983722 2/1976 Canada .................................. 75/713

Primary Examiner—Peter D. Rosenberg
Attorney, Agent, or Firm—Browdy and Neimark

[57] ABSTRACT

A system for recovering silver from photographic film comprises a wash mixer adapted to hold the film and wash water comprising water, a proteolytic enzyme and a floculant. The mixer is adapted to rotate about its longitudinal axis and comprises spiral fins disposed at the inside surface thereof and a swivel joint coaxial with the axis of rotation.

10 Claims, 2 Drawing Sheets

RECOVERY SILVER FROM PHOTO SENSITIVE MATERIALS

FIELD OF THE INVENTION

The invention relates to a method and a system for recovering silver from photographic film and the like.

BACKGROUND OF THE INVENTION

The conventional apparatus used in the recovery of silver from photographic film usually comprise a wash tank, a centrifuge and a rinse tank. After each cycle, the wash and rinse waters are discarded.

Known methods of recovering silver make use of a proteolytic enzyme or in the alternative a weak caustic solution.

For example, Canadian patent No. 983,722 discloses a method for recovering silver comprising the steps of mixing the wash water with an endopeptidase while maintaining the pH of the wash water alkaline, thereby breaking down the gelatin molecules to soluble peptide units, acidifying the wash water to effect the precipitation of the silver and separating the silver from the supernatant liquid.

U.S. Pat. No. 3,647,422 discloses a process which comprises subjecting the photographic film to a caustic solution maintained at an elevated temperature which results in the separation of the film constituents from the film base. The latter are recovered by filtration.

An object of the present invention is to provide a method which allows for a higher recovery of the silver from the film.

A further object is to provide a closed circulation system for the recovery of silver.

SUMMARY OF THE INVENTION

In general terms, according to the invention, there is provided a process for recovering silver from photographic film consisting of a plastic layer and an organic layer containing silver. The process comprises the steps of:

(a) placing the film into a wash mixture containing wash water comprising hot water having a pH in the range of 9 to 9.5, a proteolytic enzyme and a flocculant adapted to coagulate particulate silver;

(b) agitating the film in said mixer for a period of time sufficient for the proteolytic enzyme to attack and cause the organic layer of the film to separate from the plastic layer thereof and particulate silver to be released in the wash water;

(c) removing the Wash water from the mixer and passing it through means for abstracting the silver therefrom;

(d) returning the wash Water to the wash mixer;

(e) removing the plastic layer Of the film from the mixer.

The invention further provides a system for recovering silver from photographic film consisting of a plastic layer and an organic layer containing silver comprising a wash mixer adapted to hold said film and wash water comprising water, a proteolytic enzyme and a flocculant, means for supplying water to said mixer, means for supplying proteolytic enzyme to said mixer, means for supplying flocculant to said mixture, means for removing the plastic layer of the film from the mixer, means for abstracting silver from the water water, pump means for feeding the wash water from the wash mixer to the means for abstracting silver and means for circulating the wash water from the means for abstracting silver to the mixer.

DESCRIPTION OF THE DRAWINGS

The present invention will be better understood through the following detailed description of the preferred embodiment in conjunction with the accompanying simplified, not to scale, diagramatic drawings in which.

DETAILED DESCRIPTION OF THE PREFERRED EMBODIMENT

Figure 1:
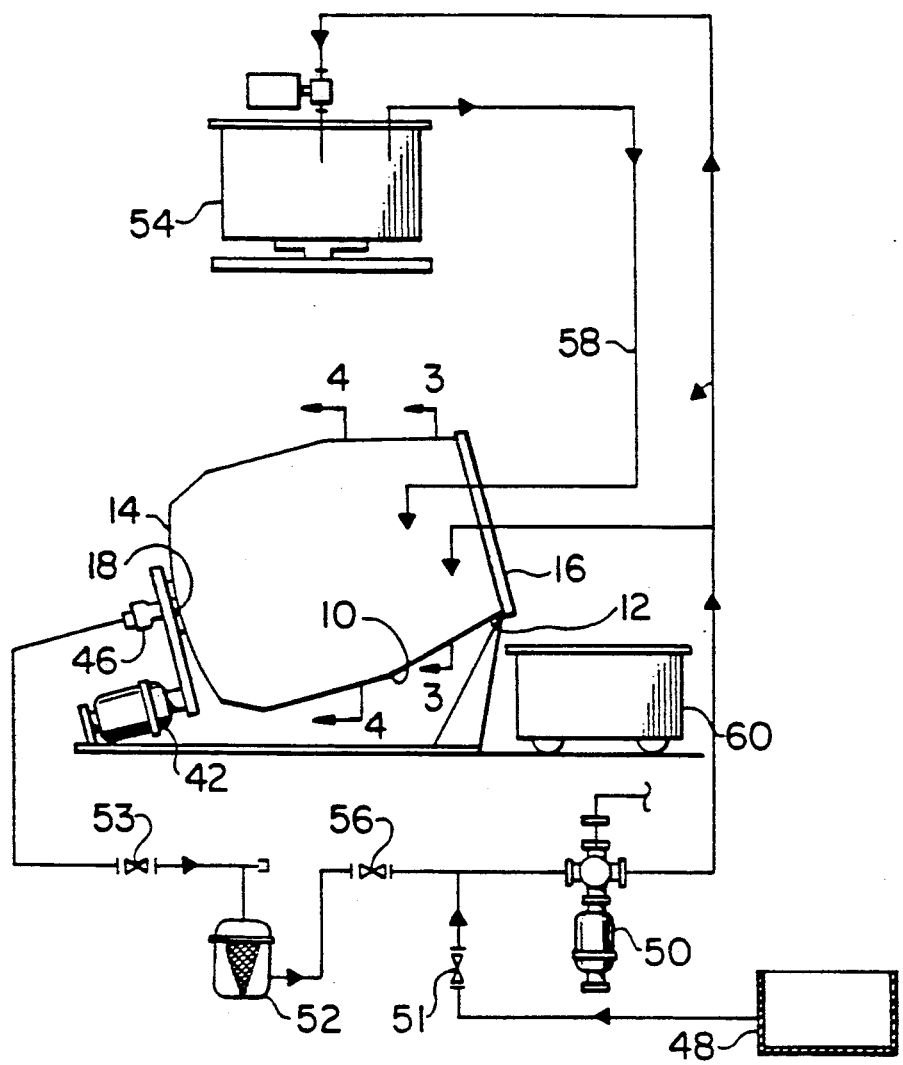
FIG. 1 is a schematic view of the system.

As shown in FIG. 1, a closed system is provided for the recovery of silver from photographic film.

Figure 4:
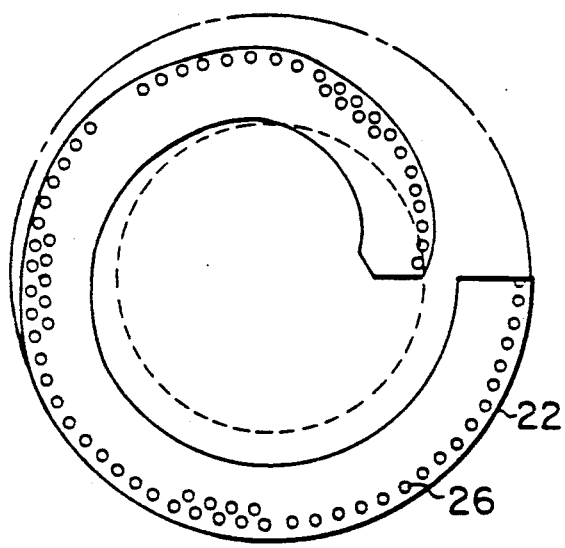
FIG. 4 is a section along line 4—4 of FIG. 1.
Figure 2:
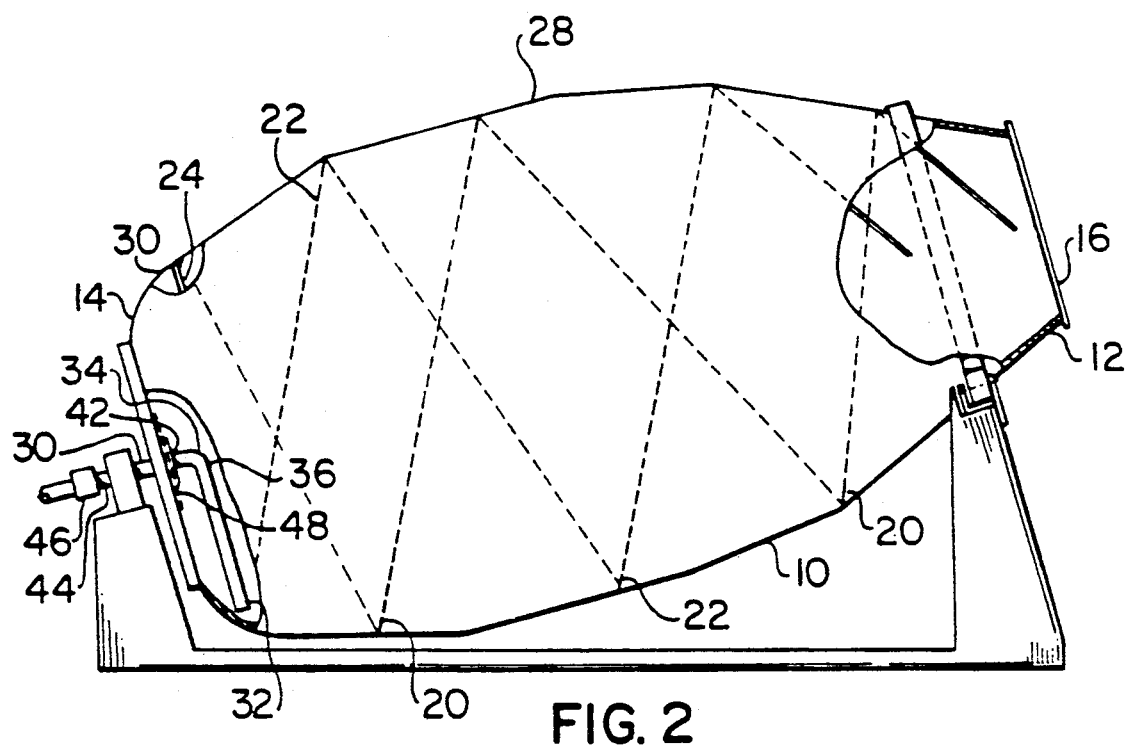
FIG. 2 is a side sectional view of the mixer of the present invention.
Figure 3:
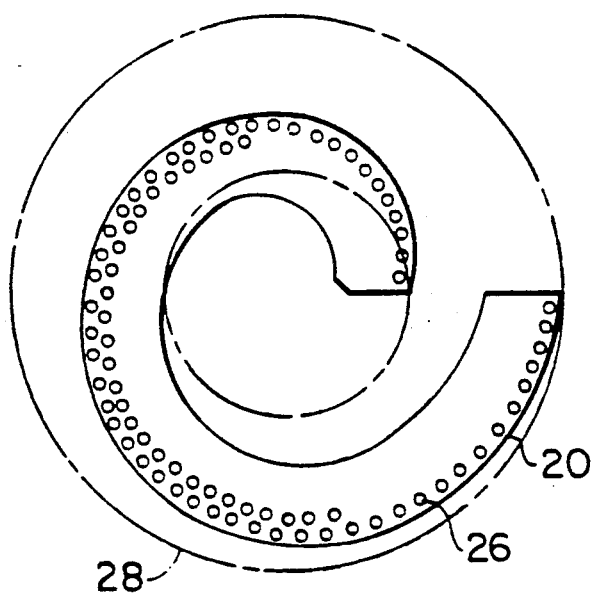
FIG. 3 is a section along line 3—3 of FIG. 1.

The system comprises a wash mixer 10 having a cylindric configuration which can rotate about its longitudinal axis. The mixer 10 is mounted at an angle in relation to the ground so that it has an upper end 12 and a lower end 14. The mixer 10 has an opening 16 disposed at its upper end 12 and an opening 18 disposed at its lower end 14. As shown in FIGS. 3 and 4, a pair of spiral fins 20 and 22 are disposed at the interior wall of the mixer 10 and extend from the opening 16 to a screen partition 24. The fins 20 and 22 comprise a matrix of circular apertures 26 therethrough in close proximity to the interior wall of the mixer 10. The fins 20 and 22 function in a manner such that when the wash mixer 10 is rotated counterclockwise, the wash water in the wash mixer 10 will pass through the apertures 26 in the fins 20 and 22 and be retained in the wash mixer while the film will be expelled therefrom. The screen partition 24 is spaced axially from the lower end 14 of the mixer 10 and divides the mixer 10 into a processing chamber 28 and a wash water withdrawal chamber 30. The screen partition 24 is adapted to prevent any film or other solid materials such as clips from leaving the mixer 10 through the opening 18. A stationary wash water outlet pipe 32 is located at the lowermost point of the withdrawal chamber 30. A first swivel joint 34 coaxial with the axis of rotation of the mixer 10 is secured to an upper end 36 of the outlet pipe 32. A wash water conduit pipe 38 extends outside of the mixer 10 through the opening 18 in the lower end 14 of the said mixer 10. A first end 42 of the wash water conduit 38 is connected to the first swivel joint 34 while a second end 44 is secured to a second swivel joint 46. A pump 47 is connected to the wash water conduit pipe 38.

The system further comprises a tank 48 from which hot water having a temperature of about 100° to 130° F. is pressure fed to the mixer 10 by a pump 50. A valve 51 can be closed to prevent the water from being introduced into the system. The pH of the water is adjusted to between 9.0 and 9.5 using caustic soda or soda ash. A proteolytic enzyme such as Kzyme (trade mark) or Rhozyme (trade mark) and a flocculant such as a water soluble cationic polymer are added to the mixer 10 through the opening 16. From the mixer 10, wash water consisting of water, proteolytic enzyme and flocculant passes through a filter 52 which removes any solid particles therefrom such as paper clips. The filter 52 has a pore diameter which is greater than that of particulate silver so that it will not retain the latter. A second value 53 can be closed to prevent the wash water from being flowed to the filter 52.

The wash water is then pressure fed to a centrifuge 54 by the pump 50. A third valve 56 can be closed to prevent the wash water from being circulated from the filter 52 into the centrifuge 54. After separation of the silver from the wash water has been effected by centrifugation, the supernatant is directed back to the mixer 10 through supernatant conduit pipe 58.

In operation, the valve 51 is opened and hot water is pumped by means of the pump 50 into the wash mixer 10. The pH of the water is adjusted to between 9 and 9.5. Floculant and a proteolytic enzyme are added to the wash mixer 10 through the opening 16 in a concentration of 0.275 ml /l. and 0.55 ml./l. respectively.

The mixer 10 is then rotated clockwise and the film introduced into the mixer 10 through the opening 16. After approximately 30 minutes or a period of time sufficient for the proteolytic enzyme to attack and cause the organic layer of the film to separate from the plastic layer thereof thereby causing particulate silver to be released in the wash water, the pump 47 is then activated. This causes the wash water to flow into the outlet pipe 32 into the wash water conduit pipe 38. The screen partition 24 ensures that any film or paper clips which have not been expelled from the mixer 10 are retained therein. The valve 53 is opened allowing the wash water to flow into the filter 52 which acts to remove any foreign particles which may have passed through the screen partition 24. The pump 50 is activated and the valve 56 is opened causing the wash water to flow to the centrifuge 54. Continous circulation of the wash water from the mixer 10 to the centrifuge 54 back to the mixer 10 takes place. The centrifuge 54 is activated and separation of the silver is effected. The supernatant wash water is flowed back to the mixer 10. The wash water is circulated from the mixer 10 to the centrifuge 54 back to the mixer 10 until the wash water is virtually free of silver, usually after about 1½ hours after inserting the film into the mixer 10. The direction of rotation of the mixer 10 is then reversed (counterclockwise rotation). The film is expelled through the opening 16 in the upper end 12 of the mixer 10 into a waste bin 60 while the wash water is retained in the mixer 10. The pH of the water is adjusted to between 9.0 and 9.5 and new film is added to the mixer 10 and a new cycle is started. After the wash water has been used for several cycles, it is returned to the mixer 10, its pH lowered to between 6.5 and 7.0 and allowed to cool for up to 12 hours or overnight. The lower pH allows any dissolved silver to return to a particulate state. The wash water is then flowed to the centrifuge 54 and separation of any silver which has returned to the particulate state is effected. The combined action of the proteolytic enzyme, the floculant and the refrigeration period allows recovery of up to 99.9% of the silver from the film.

While the present invention has been described in connection with a specific embodiment thereof and for a specific use, various modifications will occur to those skilled in the art. I therefore wish to embody within the scope of the patent which may be granted hereon all such embodiments as reasonably and properly fall Within the scope of my contribution to the art.

The embodiments of the invention in which an exclusive property or privilege is claimed are defined as follows:

1. A process for recovering silver from photosensitive material comprising a plastic layer and an organic layer containing silver, said process comprising the steps of:
  a. placing the photosensitive material into a wash mixer containing hot wash water having a pH in the range of 9 to 9.5, a proteolytic enzyme and a floculant adapted to coagulate particulate silver;
  b. agitating the material in said mixer for a period of time sufficient for the proteolytic enzyme to attack and cause the organic layer of the material to separate from the plastic layer thereof and particulate silver to be released in the water;
  c. removing the wash water from the mixer and passing it through means for extracting the silver therefrom;
  d. returing the wash water to the wash mixer; and
  e. removing the plastic layer of the material from the mixer.

2. The process of claim 1 wherein the water from the mixer is removed and put through a centrifuge.

3. The process of claim 1 wherein prior to extracting the silver from the wash water, the said wash water is passed through a filter having a pore diameter greater than that of particulate silver so as not to retain said silver.

4. The process of claim 1 further comprising the following steps:
  f. lowering the pH of the wash water to between 6.5 and 7.0;
  g. cooling the wash water for a period of time sufficient to allow any dissolved silver to return to a particulate state; and
  h. passing the wash water through means for extracting the silver therefrom.

5. A system for recovering silver from photosensitive material comprising a plastic layer and an organic layer containing silver, said system comprising a wash mixer adapted to hold said material and hot wash water, a proteolytic enzyme and a floculant for silver, means for supplying water to said mixer, means for supplying proteolytic enzyme to said mixer, means for supplying floculant to said mixer, means for abstracting silver from the wash water, pump means for feeding the wash water from the wash mixer to the means for abstracting the silver, means for circulating the wash water from the means for abstracting the silver to the mixer, and means for removing the plastic layer of the material from the mixer.

6. The system of claim 6 further comprising filter means having a pore diameter greater than that of particulate silver, said filter means being disposed between said mixer and said means for abstracting silver.

7. The system of claim 6 wherein the wash mixer comprises a container having a spiral fin disposed along the inside wall of said container extending in a convolute coaxial with the longitudinal axis of said container.

8. The system of claim 5 which is a closed circulation system.

9. For use in a closed circulation system for silver recovery from used photosensitive material: a mixing device, comprising, in combination:
  (a) an open ended container of a generally cylindric configuration, mounted for rotation about an inclined axis of rotation, said axis extending from a first, higher end of the container, to a second, lower end of the container;

(b) said container having an opening for loading and for discharging the used photosensitive material into and out of the container, the opening being generally co-axial with said axis of rotation and being disposed at said higher end;
(c) a liquid permeable, transverse partition generally perpendicular to said axis and spanning the interior of the container to divide same into a processing first chamber and a liquid withdrawal second chamber;
(d) a spiral fin disposed along the interior wall of the first chamber and extending, in a convolute coaxial with said axis, from said opening to said partition;
(e) process liquid feed means for feeding the liquid into the interior of the container;
(f) process liquid withdrawal means at said second end, including a suction conduit having a downstream and operatively associated with a pump of said closed circulation system, the upstream and of said suction conduit being provided with an intake pipe means disposed inside the second chamber and having an intake opening near a lowermost point of the second chamber, the suction conduit being secured to the container by swivel means coaxial with said axis, allowing relative rotation between the conduit and the container, whereby the intake pipe remains stationary when the container is rotated; and
(g) reversible drive means for driving the container to rotate about the axis.

10. The mixing device of claim 9 wherein perforations in the spiral fin in proximity to the interior wall of the first chamber allow the liquid to flow therethrough.

* * * * *